US012368908B2

(12) United States Patent
Gopalakrishna Rao et al.

(10) Patent No.: US 12,368,908 B2
(45) Date of Patent: Jul. 22, 2025

(54) VIDEO STREAMING SCALING USING VIRTUAL RESOLUTION ADJUSTMENT

(71) Applicant: NVIDIA Corporation, Santa Clara, CA (US)

(72) Inventors: Bhavani Gopalakrishna Rao, San Jose, CA (US); Nicholas Cook, San Jose, CA (US); James Howard, Folsom, CA (US)

(73) Assignee: NVIDIA Corporation, Santa Clara, CA (US)

(*) Notice: Subject to any disclaimer, the term of this patent is extended or adjusted under 35 U.S.C. 154(b) by 79 days.

(21) Appl. No.: 17/724,360

(22) Filed: Apr. 19, 2022

(65) Prior Publication Data
US 2023/0336799 A1 Oct. 19, 2023

(51) Int. Cl.
H04N 21/2343 (2011.01)
H04N 21/4402 (2011.01)

(52) U.S. Cl.
CPC ........ H04N 21/234363 (2013.01); H04N 21/440263 (2013.01)

(58) Field of Classification Search
CPC ........... H04N 21/234363; H04N 21/440263
See application file for complete search history.

(56) References Cited

U.S. PATENT DOCUMENTS

| 8,965,140 | B1* | 2/2015 | Xu | H04N 19/14 382/273 |
| 2008/0131011 | A1* | 6/2008 | Le Leannec | H04N 19/39 375/E7.092 |
| 2013/0132986 | A1* | 5/2013 | Mack | H04N 21/4621 725/31 |
| 2014/0015922 | A1* | 1/2014 | Zhang | H04N 21/23439 375/E7.122 |
| 2015/0109406 | A1* | 4/2015 | Carlsson | H04N 19/164 348/14.13 |
| 2017/0155922 | A1* | 6/2017 | Yoo | H04N 19/96 |
| 2023/0316884 | A1* | 10/2023 | Steiner | G08B 13/19656 |

FOREIGN PATENT DOCUMENTS

CN 105959700 A * 9/2016 ........... H04N 19/573

* cited by examiner

Primary Examiner — Timothy R Newlin
Assistant Examiner — Alexander Boyd
(74) Attorney, Agent, or Firm — Taylor Duma L.L.P.

(57) ABSTRACT

In various examples, network conditions associated with a video stream are observed over time to determine a virtual scaling factor that may be applied to the images of one or more frames of the video stream to generate scaled images that may be appended with a padding region that maintains the original resolution of the video and/or video stream such that a receiving device may crop the padding region from the received video stream during the decoding process without restarting or including additional intra-coded frames.

20 Claims, 9 Drawing Sheets

600

DETERMINE A FIRST RESOLUTION FOR ONE OR MORE FRAMES OF A VIDEO BASED AT LEAST ON DATA INDICATING ONE OR MORE NETWORK CONDITIONS ASSOCIATED WITH A VIDEO STREAM OF THE VIDEO
B602

GENERATE THE ONE OR MORE FRAMES OF THE VIDEO WITH IMAGES AT THE FIRST RESOLUTION BASED AT LEAST ON THE DETERMINING
B604

ENCODE A FRAME TO THE VIDEO STREAM, THE FRAME INCLUDING THE COMPOSITE OF THE SCALED IMAGE(S) AT THE FIRST RESOLUTION AND ONE OR MORE PADDING REGIONS EXTENDING THE SCALED IMAGE TO A SECOND RESOLUTION
B606

GENERATE ONE OR MORE PACKETS OF THE VIDEO STREAM USING THE ENCODED FRAME
B608

FIGURE 6

VIDEO STREAMING SCALING USING VIRTUAL RESOLUTION ADJUSTMENT

BACKGROUND

Providing cloud gaming services is a complex operation that requires massive amounts of sophisticated computing infrastructure, and involves maintaining a balance between gaming and network performance—ideally without impacting the user experience. In cloud gaming, video output (graphics) is generated using servers in a cloud and then streamed to a display device of the game player to be displayed. Typically, streaming systems encode video data of gameplay on the server side with decoding of the video data and rendering of video frames occurring on the client side for display on a client device. Conventionally, in order to reduce or otherwise control the latency and packet loss of a streaming system or to reduce resource usage in streaming servers (e.g., the amount of compute resources used to encode and stream a video to a client device), streaming systems may downscale or reduce the resolution of the frames encoded to a stream.

Reducing the resolution of a streamed video from 1080p to 720p reduces the bitrate needed to encode the video data and the network resources needed to transmit the video data. Some conventional streaming systems may change the resolution of a streamed game in response to reduced network bandwidth. However, reducing the resolution of a streamed game may require a "restart" or "reset" to the stream to accommodate the change in resolution. Conventionally, video coding standards do not support predicting frames of video data based on previous frames of a different resolution. Thus, when the resolution of a streamed game is modified, new intra-coded frames (e.g., I-frames) containing additional encoding information must be inserted. Due to the additional encoding information, these frames can be much larger than the predicted frames (e.g., P-frames) which may rely on information from earlier frames. This increased size of the added intra-coded frames may cause spikes in latency and/or visual stutter at the receiving device. Additionally, introducing intra-coded frames to a streamed video may cause the decoder of the receiving device to restart the video decoding process—further impacting latency and visual stutter. Conventional techniques have sought to limit the size of intra-coded frames. However, limiting the size of these frames may result in a reduced visual quality due to quantization losses and increased compression artifacts.

SUMMARY

Embodiments of the present disclosure relate to improving scalability in video streaming systems using virtual resolution adjustment. Systems and methods are disclosed that determine a scaled resolution for images of frames of a video stream based on observed network conditions and/or characteristics of the streamed content such that the images may be scaled, padded with a padding region, and streamed to a receiving device without needing to change the actual resolution of the video frames.

In contrast to conventional approaches, such as those described above, disclosed approaches may perform a "virtual" scaling of resolution associated with a video stream, such as from a game or other application, within a larger frame resolution. By reducing or increasing the effective resolution of the source video data (e.g., images) while padding and/or extending the scaled source video data, the original resolution may be maintained. Thus, predictive encoding of the video data stream may be retained without the insertion of additional, and typically larger, intra-coded frames. As intra-coded frames are not needed when decreasing or increasing the effective resolution, virtual resolution scaling can be performed at a size and/or frequency corresponding to the network conditions and/or needs of a streaming system. Further, since virtual scaling of streamed video data can be done in smaller and/or more frequent steps, existing video compression algorithms (e.g., motion estimation, etc.) may properly respond to any changes in the virtual resolution. Thus, game content may be streamed to a client device(s) with minimal or no reduction in perceived quality while reducing the encoding bitrate to account for changes in network conditions and/or network resources.

BRIEF DESCRIPTION OF THE DRAWINGS

The present systems and methods for video streaming scaling using virtual resolution adjustment described in detail below with reference to the attached drawing figures, wherein:

FIG. 6 is a flow diagram showing an example of a method for video encoding in streaming systems based at least on a virtual frame scaling, in accordance with at least some embodiments of the present disclosure;

DETAILED DESCRIPTION

Figure 1:
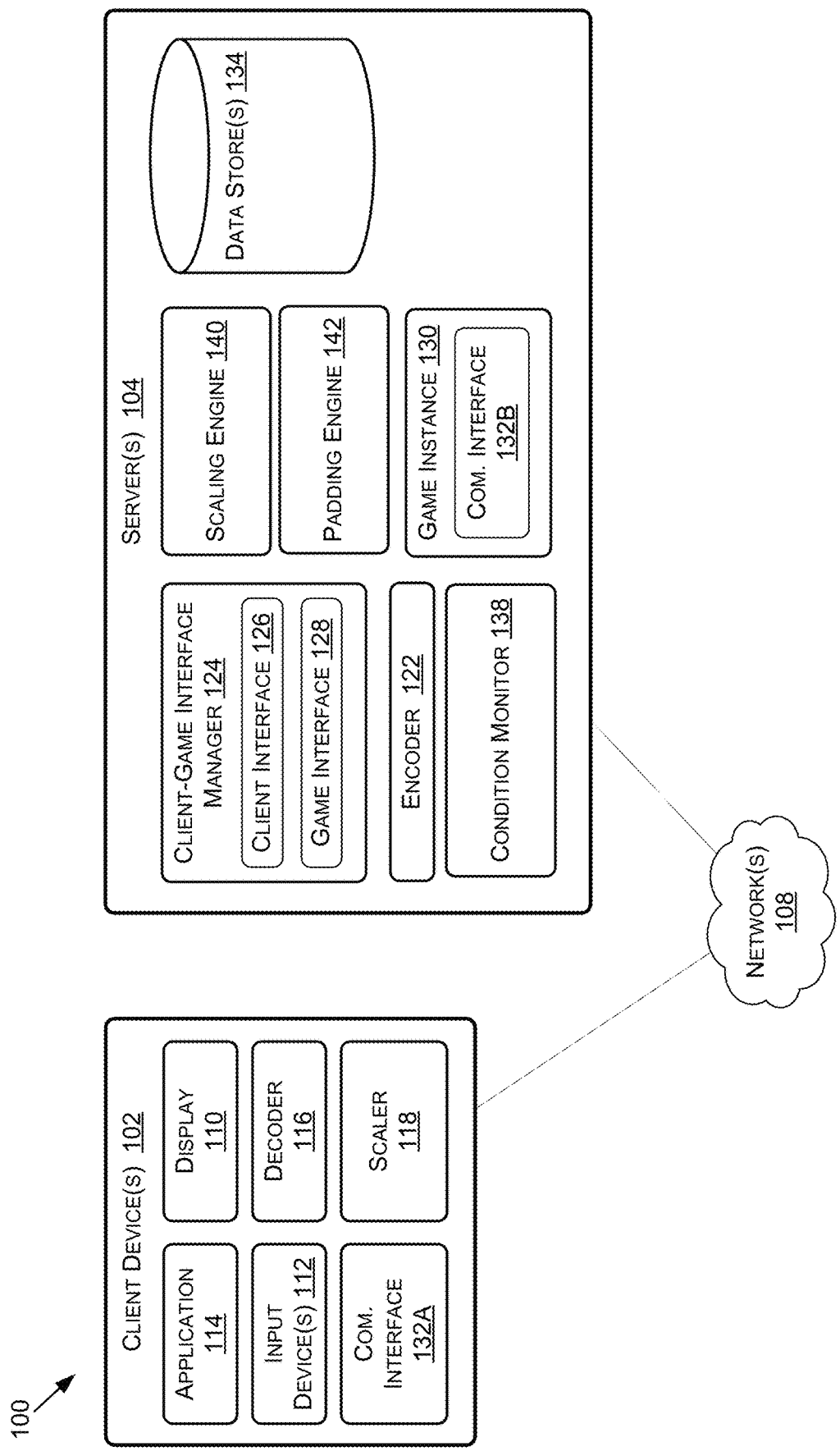
FIG. 1 is an example system diagram of a streaming system, in accordance with at least some embodiments of the present disclosure.

Systems and methods are disclosed related to video streaming scaling using virtual resolution adjustment.

In contrast to conventional approaches, such as those described above, disclosed approaches may perform a "virtual" scaling of resolution associated with a video stream, such as from a game or other application, within a larger frame resolution. By reducing or increasing the effective resolution of the source video data while padding and/or extending the scaled source video data, the original resolution may be maintained. Thus, predictive encoding of the video data stream may be retained without the insertion of additional, and typically larger, intra-coded frames. As intra-coded frames are not needed when decreasing or increasing the effective resolution, virtual resolution scaling can be performed at a size and/or frequency corresponding to the network conditions, complexity of the video data stream, and/or needs of a streaming system. Further, since virtual scaling of streamed video data can be done in smaller and/or more frequent steps, existing video compression algorithms (e.g., motion estimation, etc.) may properly respond to any changes in the virtual resolution. Thus, gaming and other application content may be streamed to a client device(s) with minimal or no reduction in perceived quality while reducing the encoding bitrate to account for changes in network conditions and/or network resources.

In various examples, the virtual resolution of video data streamed to a client device may be changed based on changes to network conditions and/or video complexity of the streamed video. For example, in response to a decrease in bitrate required or desired for encoding, a game or other application streaming server may reduce the virtual resolution of the streamed video data. For instance, the virtual resolution may be reduced to a target resolution based at least on a reduction in bitrate or increased to a target resolution based at least on an increase in the bitrate. In at least one embodiment, the virtual resolution of the video data streamed to a client device may be changed based on changes to the video complexity (e.g., the level of spatial and/or temporal information contained in the video data) of the video data stream. For example, in response to a decrease in the complexity of streamed video content, the virtual resolution of the content may be increased to make use of utilized encoding and decoding resources. In come embodiments, the observed network condition and the complexity of the video content may be used to determine whether to decrease or increase (e.g., restore) the virtual resolution of the streamed video data. In some embodiments, changes to the virtual resolution may be performed in a single step (e.g., from 1080p to 720p), while in at least one embodiment the virtual resolution may be changed in one or more steps of reducing or increasing resolution. For example, a source resolution of 1080p may be reduced to 720p over a number of steps that each reduce the resolution by an arbitrary amount of pixels and/or amounts aligned to multiples of 1, 4, 8, or 16 pixels (e.g., corresponding to block sizes of the encoding algorithm that will be used to encode the frame). In at least one example, the virtual resolution may be increased (e.g., restored) over a number of steps towards the source resolution (e.g., as network conditions and/or video complexity improves).

In some embodiments, to reduce the source resolution of the video data to a virtual resolution in a frame, the video data may be padded and/or appended with one or more padding regions in the frame. In one or more embodiments, the padding region(s) may be appended to the streamed video data such that the combined size of the reduced virtual resolution video data and the padding region(s) is equal to the original source resolution of the video data (e.g., the source video resolution and/or streamed frame resolution) and/or the previous frame resolution. For example, a 1280× 720 pixel reduced resolution video stream may be padded with padding regions of 640 horizontal pixels and 360 vertical pixels to equal an original resolution of 1920×1080 pixels. In some embodiments, the resolution of the video data may be increased or reduced in a single dimension (e.g., vertically or horizontally) while in at least one embodiment, the vertical and horizontal dimensions may each be scaled to a same or distinct ratio. In some embodiments, the padding region(s) may be applied such that the reduced resolution video data (image) aligns with any particular portion of the video frame. For example, padding regions may be applied along the right and bottom edges of the images with reduced resolution such that the non-padded video data (image) aligns with the top left corner of the video frame. In at least one other example, the padding regions may be applied such that the video data aligns with the center of the video frame or any other desired point (padding may be included on any side or sides of the virtual frame).

In some embodiments, the padding regions may comprise pixels that are set to a uniform color or appearance. For example, the padding regions may be defined such that each pixel of the padding regions is black or otherwise uniform in color. In one or more embodiments, one or more colors in a padding region may be static with respect to one or more previous frames to provide for low entropy in the padding region, resulting in high compression and reduced encoded frame size. In some embodiments, the colors assigned to one or more pixels in one or more padding regions may be determined based at least on one or more pixels of the source video data. For example, a padding region may have pixels with color values that are selected to match (or are otherwise based on) the edge pixels of the source video (e.g., downscaled source video). In some embodiments, a padding region that maintains the color values of the edge pixels of video content may be used for enhancing the performance of one or more encoding algorithms such as motion estimation and preventing color bleed. In at least one embodiment, the padding region may comprise pixels with color values that are determined to minimize or reduce the sharpness of the boundary between the video content and the padding region (e.g., for more efficient video decoding, sampling, encoding, and/or compression). For example, the color values of the pixels in the padding region may be determined such that when a decoding algorithm samples portions of a frame associated with the padding region boundary, blurring and/ or color bleed caused by the boundary (e.g., due to image quantization, chroma subsampling, etc.) may be reduced or eliminated.

In some embodiments, once a padding region(s) has been defined for a reduced or increased resolution stream of video data, the video data and the padding region may be encoded as a frame. In some examples, an encoder can update or configure a bitstream header of the stream to indicate the size and/or position of the one or more padding regions that may have been appended to the video data. For example, one or more parameters of a bitstream header may be generated or updated to reflect the updated resolution of the video data, in addition to crop/conformance parameters indicating the padding regions that should be cropped or otherwise discarded when the streamed data is decoded. In some embodiments, once at least a portion of the video data and padding region has been encoded, one or more encoded packets may be transmitted to a client device for decoding. For example, a receiving client device may decode a transmitted frame based on the parameters contained in the bitstream header or otherwise provided in association with the frame. In some embodiments, based on the parameters associated with streamed video, the client device can determine the location and/or position of the padding region(s) and perform operations to remove or disregard the padding region(s) from the video data. For example, the client device may crop a padding region from a decoded frame such that only the downscaled resolution video data remains. In some embodiments, the video data, after the padding region is cropped, may be upscaled to an output resolution, such as the resolution of a display of a client device.

The systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, autonomous or semi-autonomous machine applications, deep learning, environment or object simulation, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

With reference to FIG. 1, FIG. 1 is an example system diagram of a streaming system 100 (also referred to as "system 100"), in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The system 100 may include, among other things, one or more client devices 102, one or more servers 104, and one or more network(s) 108. Although one client device 102 is illustrated in FIG. 1, this is not intended to be limiting. In examples, there may be any number of client devices 102. The system 100 (and the components and/or features thereof) may be implemented using one or more computing devices, such as the computing device 800 of FIG. 8, and one or more data centers, such as the data center 900 of FIG. 9, described in more detail below.

The client device(s) 102 may include an application 114, a communication interface 132A, an input device(s) 112, a decoder 116, a scaler 118, and/or a display 110. Although only a few components and/or features of the client device(s) 102 are illustrated in FIG. 1, this is not intended to be limiting. For example, the client device(s) 102 may comprise additional or alternative components, such as those described below with respect to the computing device 800 of FIG. 8.

The server(s) 104 may include, among other things, a client-game interface manager 124, a game instance 130 (or "game 130"), a condition monitor 138, an encoder 122, a padding engine 142, a scaling engine 140, and/or a data store(s) 134. Although only a few components and/or features of the server(s) 104 are illustrated in FIG. 1, this is not intended to be limiting. For example, the server(s) 104 may comprise additional or alternative components, such as those described below with respect to the computing device 800 of FIG. 8 and/or the data center 900 of FIG. 9. While certain components or features may be described using the term "game" or related terminology, in one or more embodiments those components or features may more generally refer to an application or software which may or may not correspond to a game or gaming (e.g., client-application interface manager, application interface, etc.).

As an overview, the client-game interface manager 124 of the server 104 may include a client interface 126 and/or a game interface 128. The client interface 126 and the game interface 128 may be configured to manage communications via any number of network(s) 108, described herein. For example, the client-game interface manager 124 may use the client interface 126 to communicate with the application 114 of the client device(s) 102 and/or the game interface 128 to communicate with the game instance 130 of the server(s) 104.

In some examples, the game interface 128 may be configured to receive video data from the game instance 130. In some examples, the game interface 128 may be configured to encode the video data associated with gameplay from the game instance 130 using the encoder 122. The client interface 126 may be configured to transmit the encoded video data to the client device 102. In some examples, the client device(s) 102 may use an Ethernet or Wi-Fi connection through a router to access the Internet in order to communicate with the server(s) 104 through the client-game interface manager 124.

The condition monitor 138 may include one or more components and features for determining or analyzing one or more network conditions associated with video streamed to the client device(s) 102 and/or the server(s) 104 (e.g., server load and/or other server parameters). For example, the condition monitor 138 may observe network conditions for a video streamed to the client device(s) 102 via the network(s) 108. The condition monitor 138 may receive and/or collect network condition information that indicates the amount of available network bandwidth, a bitrate requirement, a desired bitrate, a server load, a server capacity, or other information associated with a video stream. In some embodiments, the condition monitor 138 may receive and/or collect information associated with the complexity of video streamed to the client device(s) 102. For example, as the complexity of the streamed video increases, the video data may be scaled down to accommodate the increased complexity of the streamed content to preserve video quality at the receiving client device(s) 102. In some embodiments, the complexity of the streamed video may be calculated and/or expressed as a complexity value. The complexity value may indicate the level and/or magnitude of complexity in encoding and/or decoding the streamed video. In some embodiments, the condition monitor 138 may observe changes to network conditions over a period of time to determine whether virtual resolution scaling operations may be needed in response to changing network conditions. For example, the condition monitor 138 may determine that there is a reduced available bandwidth for streaming video via the network(s) 108, and that a reduced bitrate requirement may be necessary for preserving stream quality in light of the changing network conditions. In such an example, the condition monitor 138 may determine that video data may need to be scaled (e.g., upscaled or downscaled) based on a determined bitrate requirement and/or threshold. In some embodiments, the condition monitor 138, may determine the amount and/or degree that frames of a video stream may be scaled to satisfy bitrate or other network requirements corresponding to the observed network conditions. For example, the condition monitor 138 may determine a target scaling resolution for frames of video data, and may provide the target scaling resolution to the scaling engine 140.

The scaling engine 140 may include one or more components and features for scaling one or more frames of video data. The scaling engine 140 may perform operations associated with upscaling and/or downscaling video frames. In some embodiments, the scaling engine may receive a target scaling resolution from the condition monitor 138 and may scale frames of video corresponding to the game instance 130. In some embodiments, the scaling engine 140 may be configured to scale frames of a video stream at a source resolution to the target scaling resolution in a single step of increasing or decreasing the resolution of the frames. In at least one other embodiment, the scaling engine 140 may be configured to scale frames of a video stream at a source resolution to the target scaling resolution in a series of steps where subsequent frames of a stream may be incrementally scaled by a scaling step size until matching, or otherwise satisfying, the target scaling resolution (e.g., a same size per step or a different size for one or more different steps).

The padding engine 142 may include one or more components and features for generating or inserting padding for frames of video scaled by the scaling engine 140. For example, based on a scaling factor and/or amount applied to a frame of video by the scaling engine 140, the padding engine 142 may generate a padding region which may be appended to the frame of video such that the effective resolution of the appended frame is a desired streaming resolution. In some embodiments, the padding engine 142 may be configured to append a padding region to a scaled frame of video such that the scaled frame of video is positioned in relation to a particular location (e.g., top-left corner, center, etc.) of the combined scaled frame of video and padding region.

In some embodiments, the padding engine 142 may analyze one or more pixels of a scaled frame of a video to determine one or more attributes associated with the generated padding region. For example, based at least on analyzing the pixels of a video frame, the padding engine 142 may determine color values associated with one or more pixels of the padding region. For instance, the color or pixel values of edge pixels of a scaled video frame may be used to determine corresponding pixel values for pixels contained in the padding region. In at least one embodiment, the pixels of the padding region generated by the padding engine 142 may be assigned a uniform pixel value (e.g., color value or coloring scheme). For example, the pixels of a generated padding region may be configured with a pixel value corresponding to black or any other suitable color.

In some embodiments, the padding engine 142 may determine size and/or position attributes associated with a generated padding region. For example, the padding engine 142 may determine coordinates of the padding region in relation to the corresponding scaled video frame for inclusion in the bitstream header. In at least one example, the padding engine 142 may determine the dimensions of a generated padding region.

The encoder 122 may include one or more components and features for encoding video data for streaming to client device(s) 102. Encoding may be performed according to any of a number of encoding parameters. One of more of the encoding parameters may define a resolution for which video data may be encoded. In some embodiments, the encoder 122 may encode video data that includes the scaled frames of a video stream generated by the scaling engine 140 and the padding region generated by the padding engine 142. In some embodiments, the encoder 122 may generate and/or embed stream attributes (e.g., virtual resolution information, such as size and/or location information) into the encoded video stream using any suitable approach. For example, the encoder may generate bitstream headers to include in the encoded video stream. In some embodiments, the attributes included in the encoded video stream may include information indicating the position and/or dimensions of a padding region included in the encoded video stream transmitted to the decoder 116 of the client device(s) 102.

In at least one embodiment, the server 104 may select encoding parameters based at least on the type of content or characteristics of the content that is streamed to the client device(s) 102. The server 104 may use a table of bitrates, or other requirements or recommendations for each genre and/or type of game or content that is streamed. For example, the data store(s) 134 may store one or more configurations that define the tables that may indicate a maximum and/or minimum streaming bitrate and/or other parameters for streaming content to produce a given quality of the content at the client device(s) 102. The data store(s) 134 may store updates to the one or more encoding parameters in the configurations.

The decoder 116 may include one or more components and features for decoding video data streamed to the client device(s) 102. The decoder 116 may be configured to determine if a received frame of video data includes a padding region(s). For example, the decoder 116 may analyze bitstream header information and/or other data associated with a received frame of video data to determine a position and/or dimensions of a padding region. Based on determining the position and/or dimensions of a padding region, the decoder 116 may process the received frame by ignoring the regions of the frame corresponding to the padding region and/or cropping the padding region from the other portions of the received frame of video data. In some embodiments, once a video stream is processed by the decoder 116, the scaler 118 may upscale and/or downscale the video stream to a particular resolution. For example, the scaler 118 may upscale the frames of a video stream to match a display resolution of the display 110.

Components of the system 100 may communicate over a network(s) 108. The network(s) 108 may include a wide area network (WAN) (e.g., the Internet, a public switched telephone network (PSTN), etc.), a local area network (LAN) (e.g., Wi-Fi, ZigBee, Z-Wave, Bluetooth, Bluetooth Low Energy (BLE), Ethernet, etc.), a low-power wide-area network (LPWAN) (e.g., LoRaWAN, Sigfox, etc.), a global navigation satellite system (GNSS) network (e.g., the Global Positioning System (GPS)), and/or another network type. In any example, each of the components of the system 100 may communicate with one or more of the other components via one or more of the network(s) 108.

The client device(s) 102 may include a smart phone, a laptop computer, a tablet computer, a desktop computer, a wearable device, a game console, a virtual reality system (e.g., a headset, a computer, a game console, remote(s), controller(s), and/or other components), an NVIDIA SHIELD, a smart-home device that may include an intelligent personal assistant (e.g., an AMAZON ECHO, a GOOGLE HOME, etc.), and/or another type of device capable of supporting streaming of video and/or audio.

The application 114 may be a mobile application, a computer application, a console application, a web browser application, a video streaming application, and/or another type of application or service. In some embodiments, multiple applications 114 may be employed. In one or more embodiments, the application 114 may include instructions that, when executed by a processor(s), cause the processor(s) to, without limitation, receive input data representative of user inputs to the one or more input device(s) 112, transmit the input data to the server(s) 104, in response receive a video stream from the client-game interface manager 124 using the communication interface 132A, and cause display of the video on the display 110. In other words, the application 114 may operate as a facilitator for enabling streaming of video of gameplay or other content associated with the application 114 on the client device(s) 102.

In one or more embodiments, the client device(s) 102 may use the application 114 to display gameplay video or other video content on the display 110. In examples where the display data is received by the client device(s) 102, the system 100 may be part of a game streaming system, such as the content streaming system 700 of FIG. 7, described in more detail below.

The display 110 may include any type of display capable of displaying the video (e.g., a light-emitting diode display (LED), an organic LED display (OLED), a liquid crystal display (LCD), an active matrix OLED display (AMOLED), a quantum dot display (QDD), a plasma display, a virtual monitor, an LED/LCD display, and/or another type of display). In some examples, the display 110 may include more than one display (e.g., a dual-monitor display for computer gaming, a first display for configuring a game and a virtual reality display for playing the game, etc.). In some examples, the display 110 is a touch-screen display, such as a touch-screen of a smart phone, tablet computer, laptop computer, or the like, where the touch-screen includes at least one of the input device(s) 112 of the client device(s) 102.

The input device(s) 112 may include any type of devices that are capable of providing user inputs to the game 130. The input device(s) may include a keyboard, a mouse, a touch-screen display, a controller(s), a remote(s), a headset (e.g., sensors of a virtual reality headset), and/or other types of input devices.

The communication interfaces such as the communication interface 132A and the communication interface 132B (referred to collectively or individually herein as "communication interface(s) 132") may include one or more components and features for communicating across one or more networks, such as the network(s) 108. The communication interface(s) 132 may be configured to communicate via any number of the network(s) 108, described herein. For example, to communicate in the system 100 of FIG. 1, the client device(s) 102 may use an Ethernet or Wi-Fi connection through a router to access the Internet in order to communicate with the server(s) 104, and/or with other client device(s) 102. In at least one embodiment, the game interface 128 and/or the client interface 126 may act as an intermediary between the communication interfaces 132.

Figure 2:
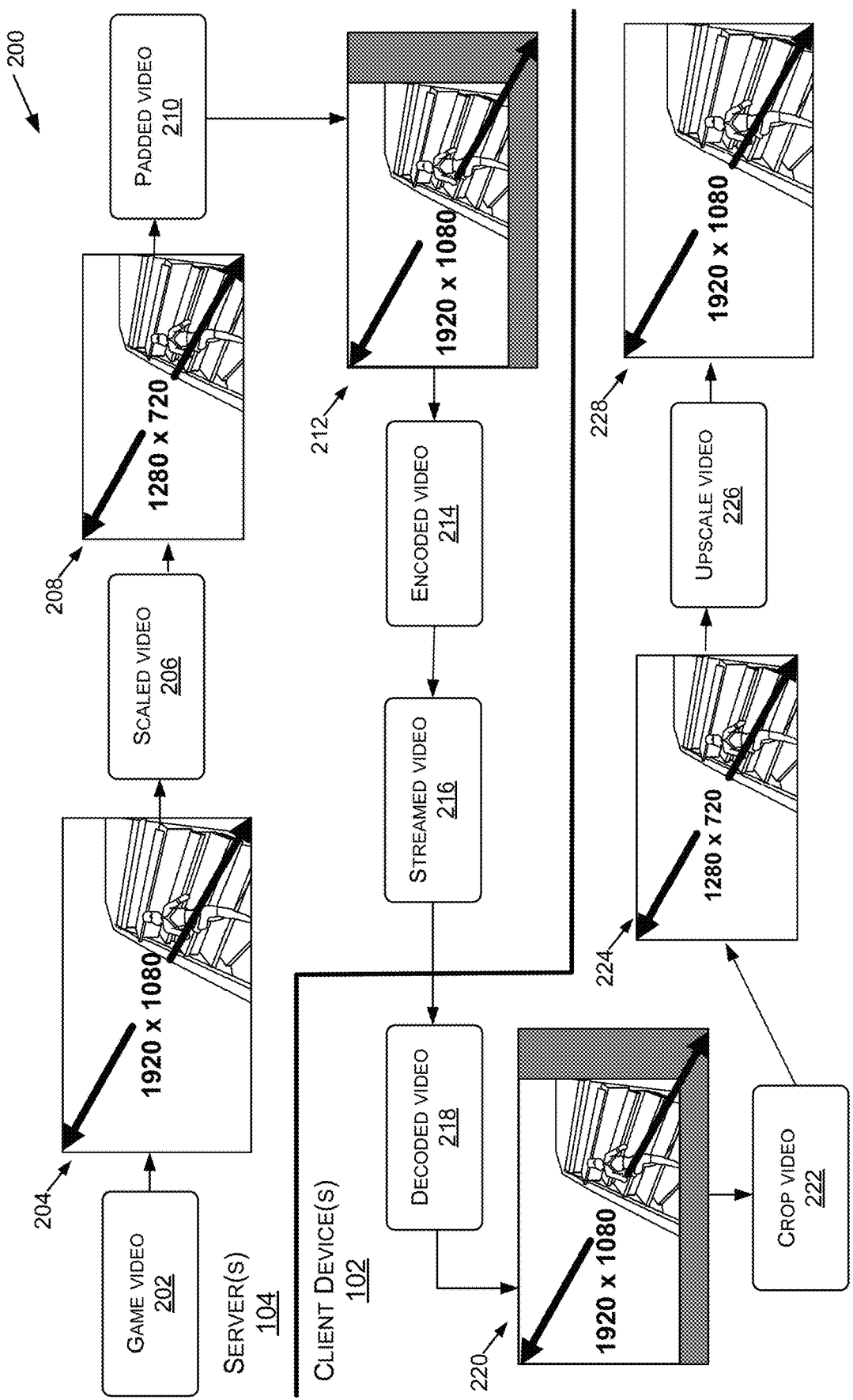
FIG. 2 is a flow diagram showing a stream encoding and decoding process, in accordance with at least some embodiments of the present disclosure.

Now referring to FIG. 2, FIG. 2 is a flow diagram showing a stream encoding and decoding process 200, in accordance with at least some embodiments of the present disclosure. The stream encoding and decoding process 200 may be implemented using the system 100 of FIG. 1. For example, the encoder 122 and decoder 116 in the system 100 may be used in the process 200 to stream and display video data. The stream encoding and decoding process 200 may be associated with game video 202 (e.g., source video), which may be generated by the game instance 130 of FIG. 1. The game video 202 may include video data representing frames associated with gameplay video of the game 130. The game video 202 may be represented using a source resolution 204. The source resolution 204 may be the native, default, and/or configured video resolution for video data generated by the game instance 130. For example, the source resolution for a particular game instance on the server 104 may be a resolution of 1920×1080 pixels for each frame of the video.

The game video 202 that is of the source resolution 204 may be scaled to a higher or lower resolution (e.g., using the scaling engine 140 and the encoder 122 according to one or more of the encoding parameters). The scaled video 206 may be represented in an upscaled or downscaled resolution 208. The scaled resolution 208 may increase or reduce the size and bitrate needed to encode the game video 202 compared to the source resolution 204. For example, the scaled resolution 208 may reduce the source resolution 204 of 1920×1080 pixels to a resolution of 1280×720 pixels.

The process 200 may generate padded video 210 using a padding operation, such as using the padding engine 142. For example, the scaled video 206 may be padded with a padding region of pixels that, along with the scaled video 206 may have a resolution of a particular size. For example, the scaled video 206 may be appended with a padding region to generate a padded video 210 such that the padded video 210 has a resolution size matching the source resolution 204 of the game video 202 or any other desired resolution. For instance, a padding region may be appended to the scaled video 206 having a scaled resolution 208 of 1280×720 pixels such that the resulting padded video 210 may have a padded resolution 212 matching the source resolution 204 of the game video 202 of 1920×1080 pixels.

The process 200 may generate encoded video 214 using an encoder, such as the encoder 122. For example, the padded video 210 may be encoded to be compatible with a streaming format, destination, codec, and/or any other parameter for streaming video data. The encoded video 214 may be encoded with information such as bitstream header information and/or metadata that indicates characteristics associated with the padding region of the padded video 210. For example, the encoder 122 may include bitstream header information in the encoded video 214 that may indicate the size, location, position, and/or contents of a padding region associated with the padded video 210 being encoded. The encoded video 214 may be streamed as streamed video 216 (e.g., using the client interface 126). For example, the server(s) 104 may transmit the streamed video 216 to one or more client devices 102. Once the one or more client devices 102 receive the streamed video 216, they may generate the decoded video 218 (e.g., using the decoder 116).

In some embodiments, the decoded video 218 may have a decoded resolution 220. For example, the decoded resolution 220 of the decoded video may match the padded resolution 212 of the padded video 210 generated by the server(s) 104. In some embodiments, the padding region of the padded video 210 may be present in the decoded video 218 generated by the client device(s) 102. The padding region in the decoded video 218 may be cropped from other portions of the decoded video 218 to generate a cropped video 222 having a cropped resolution 224. For example, the decoder 116 may identify the padding regions in the received video, using embedded bitstream header information and/or other operations (e.g., image analysis, neural networks, etc.) to determine the padding region of the decoded video 218 that may be cropped. In at least one example, the cropped resolution 224 of the cropped video 222 may be the same as the scaled resolution 208 of the scaled video 206.

In some embodiments, once the padding region has been cropped or otherwise removed to generate the cropped video 222, the cropped video may be scaled to produce an upscaled video 226. In some embodiments, the upscaled video 226 may be represented in an upscaled resolution 228. The upscaled resolution 228 may be a resolution that is greater than the scaled resolution 208. In some embodiments, the upscaled resolution 228 may be a resolution that is greater or equal to the source resolution 204. For example, an upscaled resolution of 3840×2160 pixels may be greater than a source resolution of 1920×1080 pixels generated by the server(s) 104. In one or more embodiment, an upscaled resolution may be determined based on a display resolution associated with the display 110 of the client device(s) 102.

Figure 3:
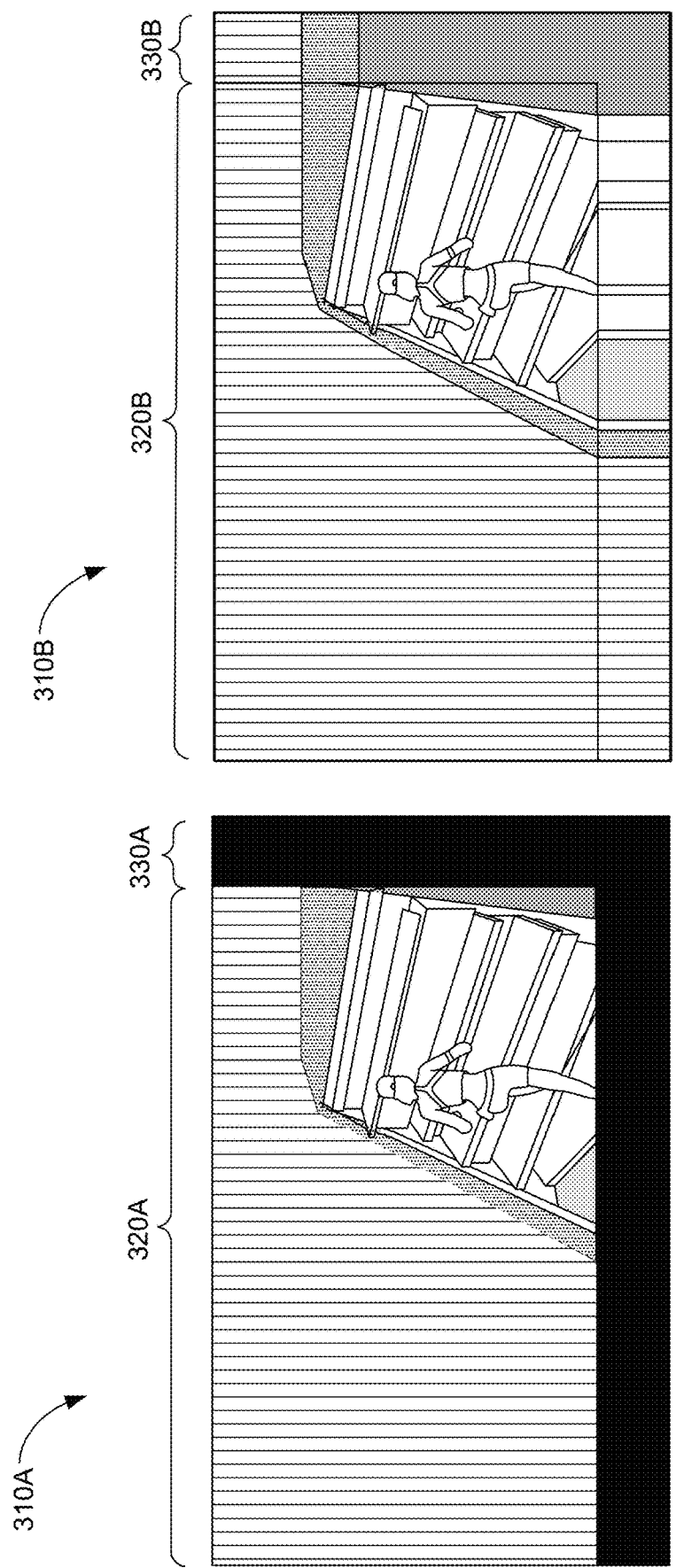
FIG. 3 is an example depiction of a frame padding, in accordance with at least some embodiments of the present disclosure.

Now referring to FIG. 3, FIG. 3 is an example depiction of frame padding, in accordance with at least some embodiments of the present disclosure. The frame padding may be included in a padded frame, such as padded frames 310A and 310B. A padded frame, such as padded frames 310A and 310B may include a video frame (e.g., a virtual video frame), such as video frames 320A and 320B and a padding region, such as padding regions 330A and 330B. In some embodiments, the padding regions may be appended to the video frame such that the size of the video frame and the padding region is equal to the original source resolution of the video data (e.g., source game resolution) and/or any other desired resolution. In some embodiments, the padding regions may be applied such that the reduced resolution video data aligns with any particular portion of the video frame. For example, padding regions 330A and 330B are positions such that video frames 320A and 320B are positioned in the top-left quadrant of the padded frames 310A and 310B.

In some embodiments, the padding regions may comprise pixels that are set to a uniform color or appearance. For example, the padding region 330A may be generated such that each pixel of the padding region 330A is black in color. In some embodiments, the colors assigned to pixels in padding regions may be determined based at least on one or more pixels of the streamed video data. For example, the padding region 330B depicts pixels with color values that are selected to match (or are otherwise based on) the pixels (e.g., edge pixels) of the video frame 320B. In some embodiments, the color values of the pixels in the padding regions 330A and 330B may be determined to enhance the performance of one or more encoding algorithms such as motion estimation, preventing color bleed, compression, and/or other predictive algorithms.

Figure 4:
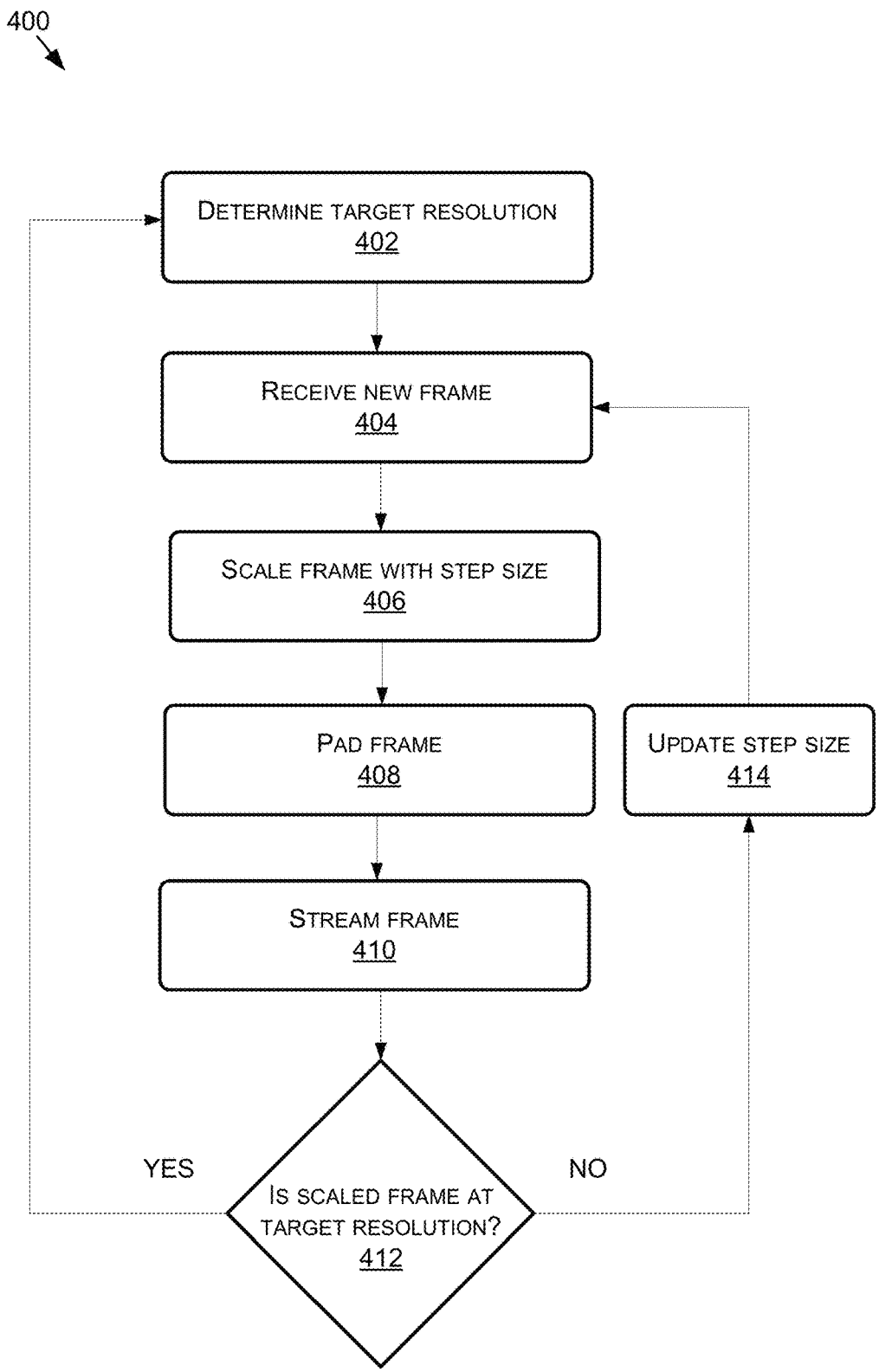
FIG. 4 is a diagram of an example of a frame scaling process for use in a streaming system, in accordance with at least some embodiments of the present disclosure.

Now referring to FIG. 4, FIG. 4 is a diagram of an example of a frame scaling process 400 for use in a streaming system, in accordance with at least some embodiments of the present disclosure. The process 400, at step 402, may include determining a target resolution. For example, based on network conditions observed by the condition monitor 138, the scaling engine 140 may determine a target resolution that satisfies bitrate or other requirements of the streaming system. In some examples, the resolution of subsequent frames of a video stream may be reduced to arrive at the determined target resolution over a number of iterations that each reduce the resolution by amounts aligned to multiples of 4, 8, or 16 pixels.

The process 400, at step 404, may include receiving a new frame of video in a video stream. The process 400, at step 406, may include scaling the image of the frame according to an iteration (e.g., step size). For example, when a new frame of video data is received, as at step 404, the image of the new frame may be scaled to a different resolution by increasing or decreasing the resolution of the image by a step size that may be represented as a number of pixels in the vertical and/or horizontal dimensions of the frame. For example, an image may be downscaled by a step size of 128 pixels, or a step of any other size. In some examples, a distinct step size may be determined for the vertical and horizontal dimensions of the frame. In such an example, the step size corresponding to the vertical dimension may be determined independently of the step size corresponding to the horizontal dimension of the frame.

The process 400, at step 408, may include padding the image scaled at step 406 with a padding region. The size of the padding region may be determined based on the amount of pixels the image was upscaled or downscaled at step 406, such that the total (e.g., composite) size of the padding region and the scaled image equals a desired resolution (e.g., source resolution of game instance). For example, as the amount of pixels by which an image is downscaled increases, the padding region increases in size (e.g., number of pixels) such the desired resolution for a frame is maintained, while the compute required to encode the data of the composite frame is reduced, due to optimizations of compressing duplicate data in the padding region. At step 410 of the process 400, once the composite frame has been encoded, the composite frame may be streamed, for example, to a client device(s) 102 of FIG. 1.

The process 400, at step 412, may include determining whether the scaled image frame meets a target resolution (e.g., the resolution that the image is scaled based on network conditions and/or bitrate targets). In examples where the scaled image frame satisfies the target resolution, subsequent frames of video data may continue to scale respective corresponding images at the current scaling resolution until a new (e.g., different) target resolution is determined or selected. In examples, where the current scaled image does not satisfy the target resolution, the process 400, at step 414, may include updating the step size by which newly received frames of video are scaled. For example, if a previous frame of video has an image with a resolution of 1360×860, and where the target scaled resolution is 1280×720, the scaling step size may be updated such that the image of a subsequent frame of video is scaled to an updated resolution of 1296×824 (e.g., reducing previous resolution by 64 pixels in the horizontal dimension and 36 pixels in the vertical dimension; 64 and 36 being a multiples of 4, 8, or 16 pixels). By updating the step size by which images of received frames of video are scaled, images corresponding to the frames of a video stream can be scaled to a target resolution over a number of incremental steps.

Figure 5:
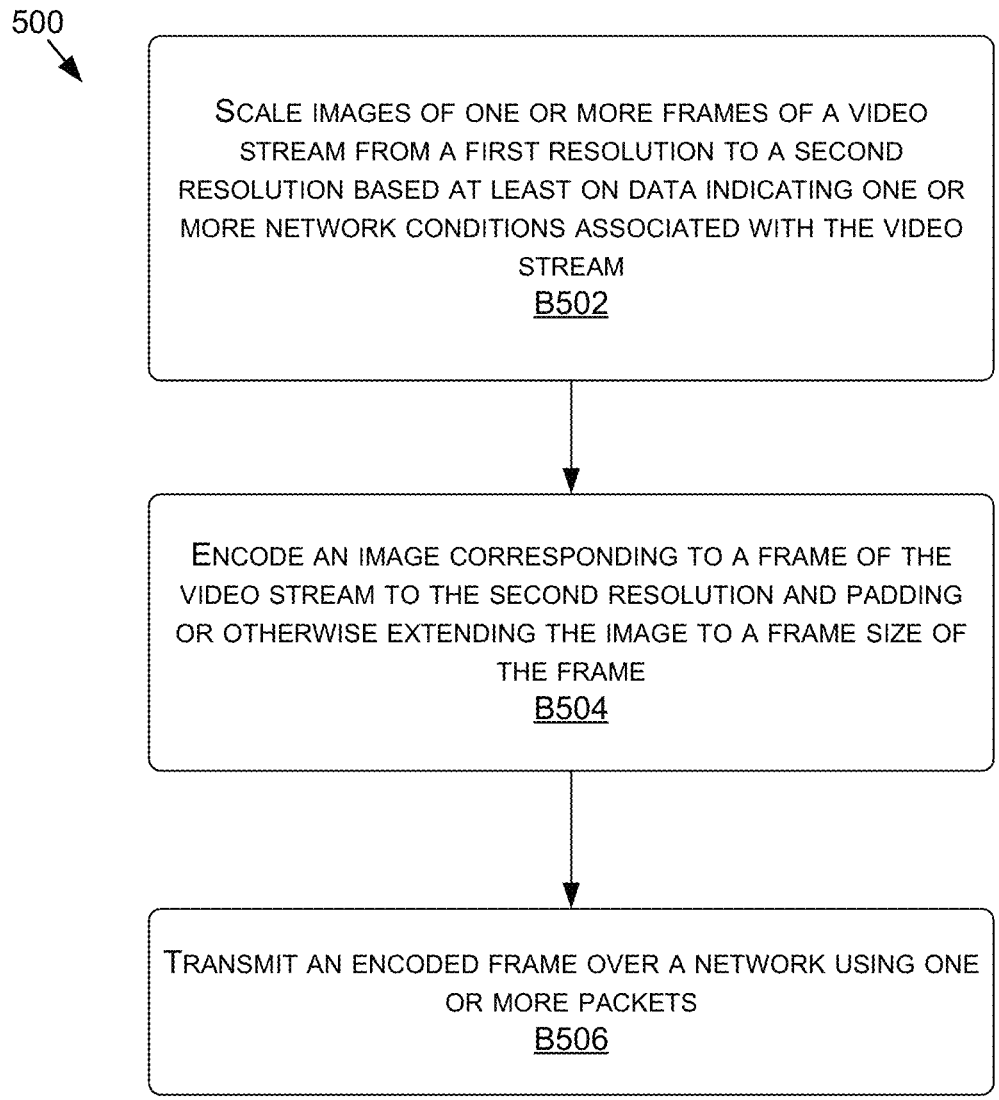
FIG. 5 is a flow diagram showing an example of a method for video encoding in streaming systems based at least on network conditions, in accordance with at least some embodiments of the present disclosure.

Now referring to FIG. 5, each block of method 500, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 500 is described, by way of example, with respect to the system 100 of FIG. 1. However, this method may additionally or alternatively be executed by any one system, or any combination of systems, including, but not limited to, those described herein.

FIG. 5 is a flow diagram showing an example of a method for video encoding in streaming systems based at least on network conditions, in accordance with some embodiments of the present disclosure. The method 500, at block B502, includes scaling images of one or more frames of a video stream from a first resolution to a second resolution based at least on data indicating one or more network conditions associated with the video stream. For example, based on network conditions observed by the condition monitor 138, the scaling engine 140 may scale images of one or more frames corresponding to the game instance 130.

The method 500, at block B504, includes encoding an image corresponding to a frame of the video stream to the second resolution and padding or otherwise extending the image to a frame size of the frame. For example, the encoder 122 may encode one or more images of video data that has been scaled by the scaling engine 140 and padded with a padding region by the padding engine 142.

The method 500, at block B506, includes transmitting an encoded frame over a network using one or more packets. For example, the server(s) 104 may generate streaming video data as a plurality of data packets using the encoder 122 and padded frames of video data.

Now referring to FIG. 6, each block of method 600, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 600 is described, by way of example, with respect to the system of FIG. 1. However, this method may additionally or alternatively be executed by any one system, or any combination of systems, including, but not limited to, those described herein.

FIG. 6 is a flow diagram showing an example of a method for video encoding in streaming systems based at least on a virtual frame scaling, in accordance with some embodiments of the present disclosure. The method 600, at block B602, includes determining a first resolution for one or more frames of a video based at least on data indicating one or more network conditions associated with a video stream of the video. For example, the condition monitor 138 may observe conditions of the network(s) 108 and determine a resolution used by the scaling engine 140 to scale video data associated with the game instance 130.

The method 600, at block B604, includes generating the one or more frames of the video with images at the first resolution based at least on the determining. For example, the scaling engine 140 may scale image or other video data associated with the game instance 130 to a resolution determined based on network conditions observed by the condition monitor 138.

The method 600, at block B606, includes encoding a frame to the video stream, the frame including the composite of the scaled image(s) at the first resolution and one or more padding regions extending the scaled image to a second resolution. The composite image is then encoded as a frame by, for example, using the encoder 122 to encode the scaled frames of video generated by the scaling engine 140 and a padding region generated by the padding engine 142.

The method 600, at block B608, includes generating one or more packets of the video stream using the encoded frame. For example, the encoder 122 may generate data for one or more encoded video data streams that may be streamed to the client device(s) 102.

Example Content Streaming System

Figure 7:
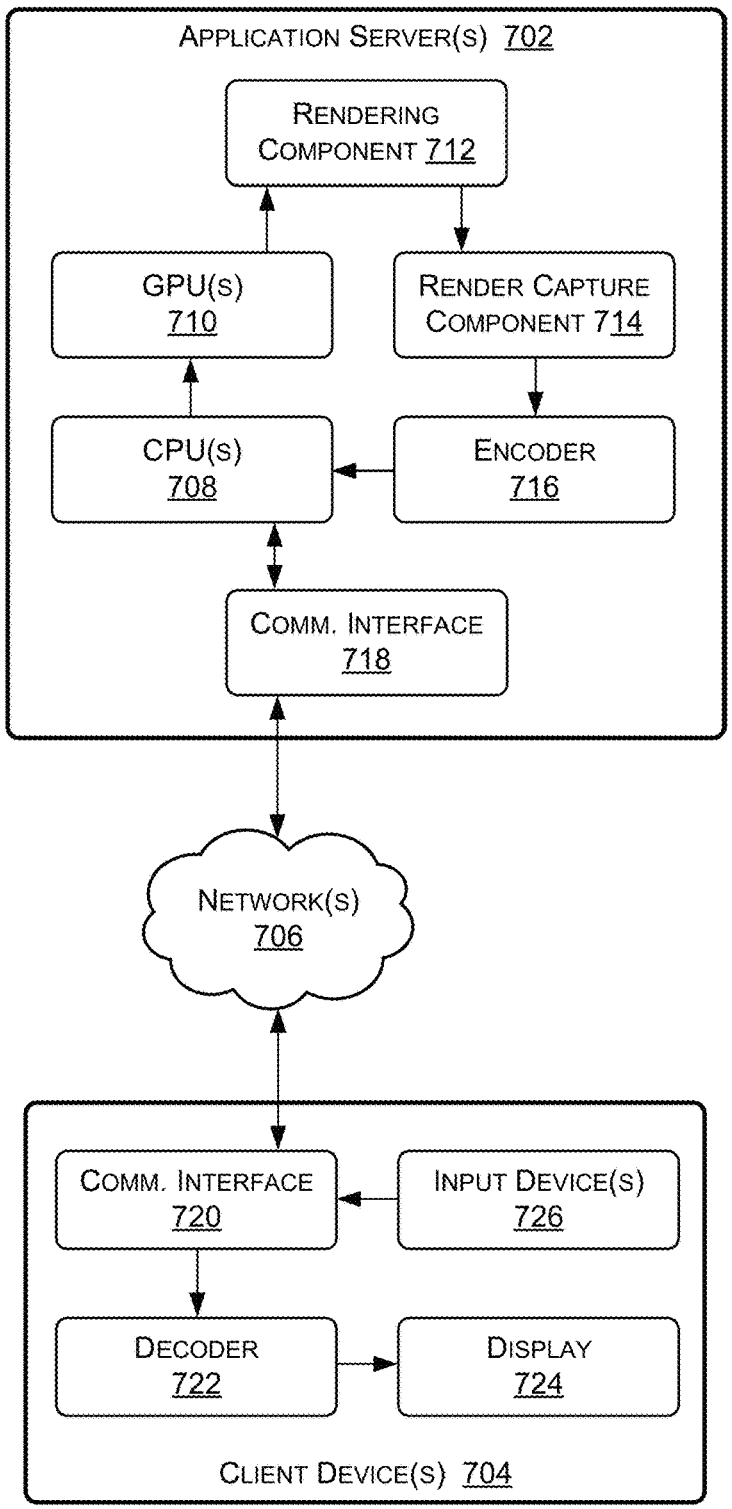
FIG. 7 is a block diagram of an example content streaming system suitable for use in implementing some embodiments of the present disclosure.

Now referring to FIG. 7, FIG. 7 is an example system diagram for a content streaming system 700, in accordance with some embodiments of the present disclosure. FIG. 7 includes application server(s) 702 (which may include similar components, features, and/or functionality to the example computing device 800 of FIG. 8), client device(s) 704 (which may include similar components, features, and/or functionality to the example computing device 800 of FIG. 8), and network(s) 706 (which may be similar to the network(s) described herein). In some embodiments of the present disclosure, the system 700 may be implemented. The application session may correspond to a game streaming application (e.g., NVIDIA GeFORCE NOW), a remote desktop application, a simulation application (e.g., autonomous or semi-autonomous vehicle simulation), computer aided design (CAD) applications, virtual reality (VR) and/or augmented reality (AR) streaming applications, deep learning applications, and/or other application types.

In the system 700, for an application session, the client device(s) 704 may only receive input data in response to inputs to the input device(s), transmit the input data to the application server(s) 702, receive encoded display data from the application server(s) 702, and display the display data on the display 724. As such, the more computationally intense computing and processing is offloaded to the application server(s) 702 (e.g., rendering—in particular ray or path tracing—for graphical output of the application session is executed by the GPU(s) of the game server(s) 702). In other words, the application session is streamed to the client device(s) 704 from the application server(s) 702, thereby reducing the requirements of the client device(s) 704 for graphics processing and rendering.

For example, with respect to an instantiation of an application session, a client device 704 may be displaying a frame of the application session on the display 724 based on receiving the display data from the application server(s) 702. The client device 704 may receive an input to one of the input device(s) and generate input data in response. The client device 704 may transmit the input data to the application server(s) 702 via the communication interface 720 and over the network(s) 706 (e.g., the Internet), and the application server(s) 702 may receive the input data via the communication interface 718. The CPU(s) may receive the input data, process the input data, and transmit data to the GPU(s) that causes the GPU(s) to generate a rendering of the application session. For example, the input data may be representative of a movement of a character of the user in a game session of a game application, firing a weapon, reloading, passing a ball, turning a vehicle, etc. The rendering component 712 may render the application session (e.g., representative of the result of the input data) and the render capture component 714 may capture the rendering of the application session as display data (e.g., as image data capturing the rendered frame of the application session). The rendering of the application session may include ray or path-traced lighting and/or shadow effects, computed using one or more parallel processing units—such as GPUs, which may further employ the use of one or more dedicated hardware accelerators or processing cores to perform ray or path-tracing techniques—of the application server(s) 702. In some embodiments, one or more virtual machines (VMs)—e.g., including one or more virtual components, such as vGPUs, vCPUs, etc.—may be used by the application server(s) 702 to support the application sessions. The encoder 716 may then encode the display data to generate encoded display data and the encoded display data may be transmitted to the client device 704 over the network(s) 706 via the communication interface 718. The client device 704 may receive the encoded display data via the communication interface 720 and the decoder 722 may decode the encoded display data to generate the display data. The client device 704 may then display the display data via the display 724.

The systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, autonomous or semi-autonomous machine applications, deep learning, environment simulation, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

Example Computing Device

Figure 8:
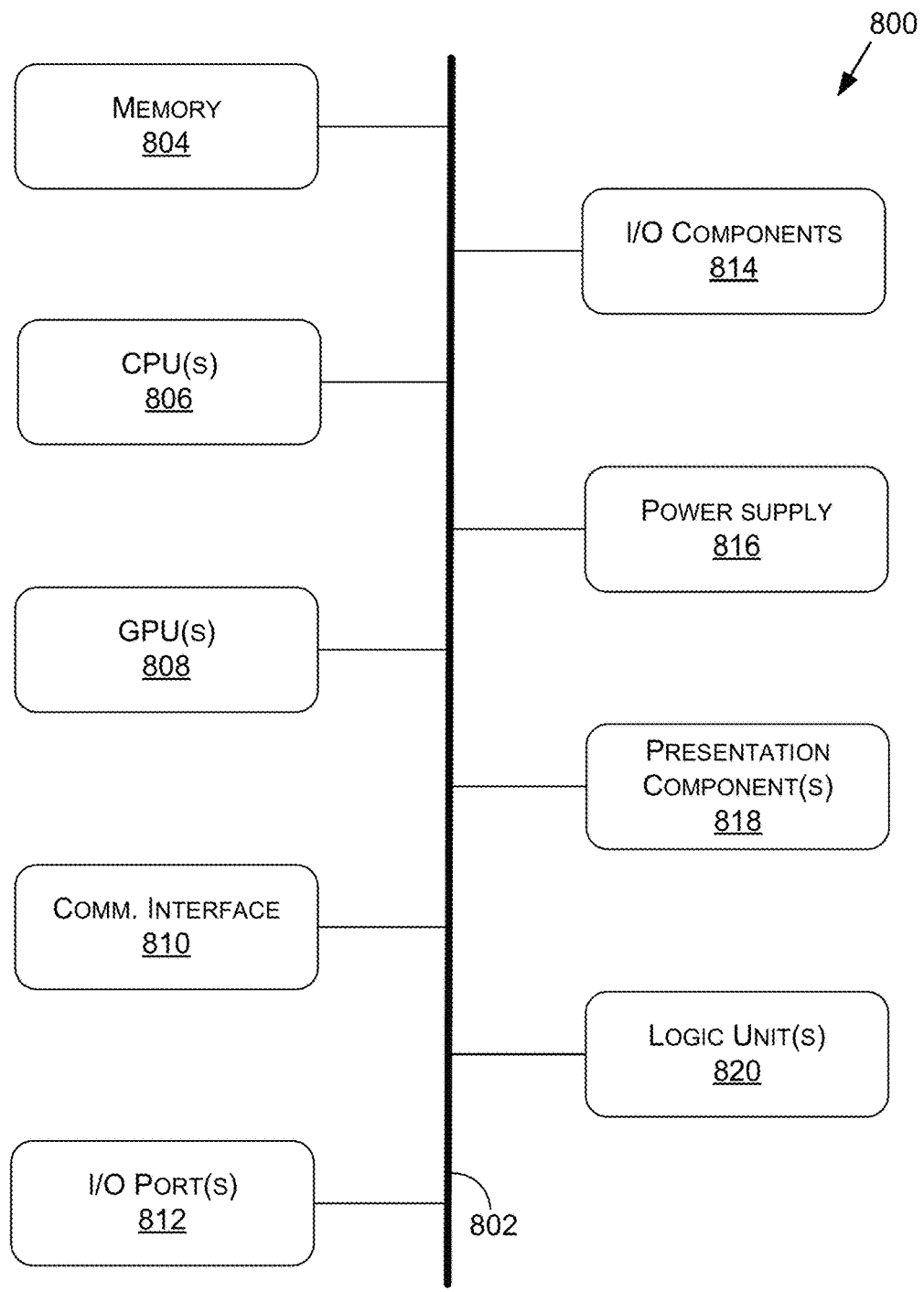
FIG. 8 is a block diagram of an example computing device suitable for use in implementing some embodiments of the present disclosure.

FIG. 8 is a block diagram of an example computing device(s) 800 suitable for use in implementing some embodiments of the present disclosure. Computing device 800 may include an interconnect system 802 that directly or indirectly couples the following devices: memory 804, one or more central processing units (CPUs) 806, one or more graphics processing units (GPUs) 808, a communication interface 810, input/output (I/O) ports 812, input/output components 814, a power supply 816, one or more presentation components 818 (e.g., display(s)), and one or more logic units 820. In at least one embodiment, the computing device(s) 800 may comprise one or more virtual machines (VMs), and/or any of the components thereof may comprise virtual components (e.g., virtual hardware components). For non-limiting examples, one or more of the GPUs 808 may comprise one or more vGPUs, one or more of the CPUs 806 may comprise one or more vCPUs, and/or one or more of the logic units 820 may comprise one or more virtual logic units. As such, a computing device(s) 800 may include discrete components (e.g., a full GPU dedicated to the computing device 800), virtual components (e.g., a portion of a GPU dedicated to the computing device 800), or a combination thereof.

Although the various blocks of FIG. 8 are shown as connected via the interconnect system 802 with lines, this is not intended to be limiting and is for clarity only. For example, in some embodiments, a presentation component 818, such as a display device, may be considered an I/O component 814 (e.g., if the display is a touch screen). As another example, the CPUs 806 and/or GPUs 808 may include memory (e.g., the memory 804 may be representative of a storage device in addition to the memory of the GPUs 808, the CPUs 806, and/or other components). In other words, the computing device of FIG. 8 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 8.

The interconnect system 802 may represent one or more links or busses, such as an address bus, a data bus, a control bus, or a combination thereof. The interconnect system 802 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 806 may be directly connected to the memory 804. Further, the CPU 806 may be directly connected to the GPU 808. Where there is direct, or point-to-point connection between components, the interconnect system 802 may include a PCIe link to carry out the connection. In these examples, a PCI bus need not be included in the computing device 800.

The memory 804 may include any of a variety of computer-readable media. The computer-readable media may be any available media that may be accessed by the computing device 800. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 804 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 800. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 806 may be configured to execute at least some of the computer-readable instructions to control one or more components of the computing device 800 to perform one or more of the methods and/or processes described herein. The CPU(s) 806 may each include one or more cores (e.g., one, two, four, eight, twenty-eight, seventy-two, etc.) that are capable of handling a multitude of software threads simultaneously. The CPU(s) 806 may include any type of processor, and may include different types of processors depending on the type of computing device 800 implemented (e.g., processors with fewer cores for mobile devices and processors with more cores for servers). For example, depending on the type of computing device 800, the processor may be an Advanced RISC Machines (ARM) processor implemented using Reduced Instruction Set Computing (RISC) or an x86 processor implemented using Complex Instruction Set Computing (CISC). The computing device 800 may include one or more CPUs 806 in addition to one or more microprocessors or supplementary co-processors, such as math co-processors.

In addition to or alternatively from the CPU(s) 806, the GPU(s) 808 may be configured to execute at least some of the computer-readable instructions to control one or more components of the computing device 800 to perform one or more of the methods and/or processes described herein. One or more of the GPU(s) 808 may be an integrated GPU (e.g., with one or more of the CPU(s) 806 and/or one or more of the GPU(s) 808 may be a discrete GPU. In embodiments, one or more of the GPU(s) 808 may be a coprocessor of one or more of the CPU(s) 806. The GPU(s) 808 may be used by the computing device 800 to render graphics (e.g., 3D graphics) or perform general purpose computations. For example, the GPU(s) 808 may be used for General-Purpose computing on GPUs (GPGPU). The GPU(s) 808 may include hundreds or thousands of cores that are capable of handling hundreds or thousands of software threads simultaneously. The GPU(s) 808 may generate pixel data for output images in response to rendering commands (e.g., rendering commands from the CPU(s) 806 received via a host interface). The GPU(s) 808 may include graphics memory, such as display memory, for storing pixel data or any other suitable data, such as GPGPU data. The display memory may be included as part of the memory 804. The GPU(s) 808 may include two or more GPUs operating in parallel (e.g., via a link). The link may directly connect the GPUs (e.g., using NVLINK) or may connect the GPUs through a switch (e.g., using NVSwitch). When combined together, each GPU 808 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 806 and/or the GPU(s) 808, the logic unit(s) 820 may be configured to execute at least some of the computer-readable instructions to control one or more components of the computing device 800 to perform one or more of the methods and/or processes described herein. In embodiments, the CPU(s) 806, the GPU(s) 808, and/or the logic unit(s) 820 may discretely or jointly perform any combination of the methods, processes and/or portions thereof. One or more of the logic units 820 may be part of and/or integrated in one or more of the CPU(s) 806 and/or the GPU(s) 808 and/or one or more of the logic units 820 may be discrete components or otherwise external to the CPU(s) 806 and/or the GPU(s) 808. In embodiments, one or more of the logic units 820 may be a coprocessor of one or more of the CPU(s) 806 and/or one or more of the GPU(s) 808.

Examples of the logic unit(s) 820 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 810 may include one or more receivers, transmitters, and/or transceivers that enable the computing device 800 to communicate with other computing devices via an electronic communication network, included wired and/or wireless communications. The communication interface 810 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 820 and/or communication interface 810 may include one or more data processing units (DPUs) to transmit data received over a network and/or through interconnect system 802 directly to (e.g., a memory of) one or more GPU(s) 808.

The I/O ports 812 may enable the computing device 800 to be logically coupled to other devices including the I/O components 814, the presentation component(s) 818, and/or other components, some of which may be built in to (e.g., integrated in) the computing device 800. Illustrative I/O components 814 include a microphone, mouse, keyboard, joystick, game pad, game controller, satellite dish, scanner, printer, wireless device, etc. The I/O components 814 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 800. The computing device 800 may be include depth cameras, such as stereoscopic camera systems, infrared camera systems, RGB camera systems, touchscreen technology, and combinations of these, for gesture detection and recognition. Additionally, the computing device 800 may include accelerometers or gyroscopes (e.g., as part of an inertia measurement unit (IMU)) that enable detection of motion. In some examples, the output of the accelerometers or gyroscopes may be used by the computing device 800 to render immersive augmented reality or virtual reality.

The power supply 816 may include a hard-wired power supply, a battery power supply, or a combination thereof. The power supply 816 may provide power to the computing device 800 to enable the components of the computing device 800 to operate.

The presentation component(s) 818 may include a display (e.g., a monitor, a touch screen, a television screen, a heads-up-display (HUD), other display types, or a combination thereof), speakers, and/or other presentation components. The presentation component(s) 818 may receive data from other components (e.g., the GPU(s) 808, the CPU(s) 806, DPUs, etc.), and output the data (e.g., as an image, video, sound, etc.).

Example Data Center

Figure 9:
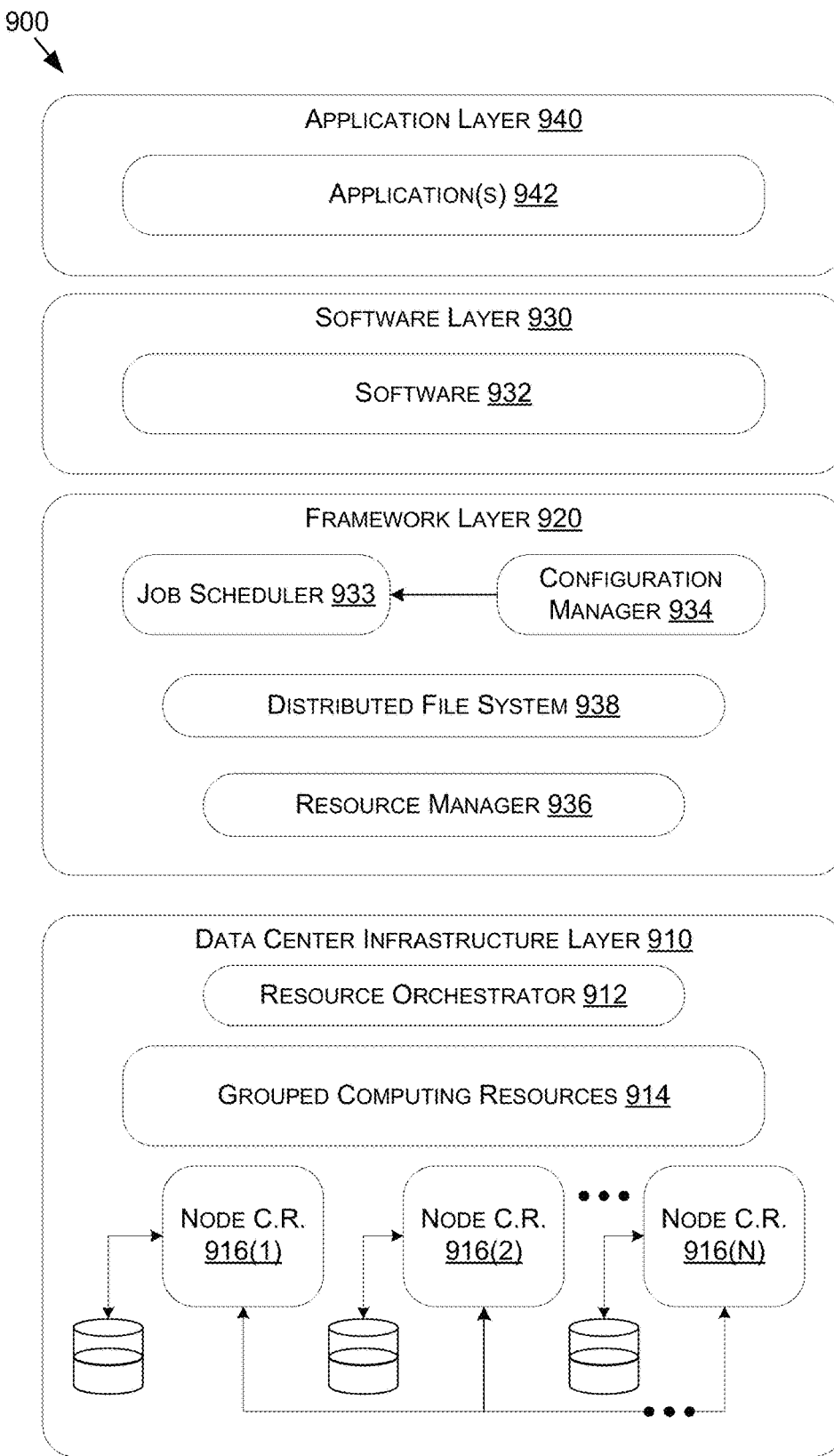
FIG. 9 is a block diagram of an example data center suitable for use in implementing some embodiments of the present disclosure.

FIG. 9 illustrates an example data center 900 that may be used in at least one embodiments of the present disclosure. The data center 900 may include a data center infrastructure layer 910, a framework layer 920, a software layer 930, and/or an application layer 940.

As shown in FIG. 9, the data center infrastructure layer 910 may include a resource orchestrator 912, grouped computing resources 914, and node computing resources ("node C.R.s") 916(1)-916(N), where "N" represents any whole, positive integer. In at least one embodiment, node C.R.s 916(1)-916(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 916(1)-916(N) may correspond to a server having one or more of the above-mentioned computing resources. In addition, in some embodiments, the node C.R.s 916(1)-9161(N) may include one or more virtual components, such as vGPUs, vCPUs, and/or the like, and/or one or more of the node C.R.s 916(1)-916(N) may correspond to a virtual machine (VM).

In at least one embodiment, grouped computing resources 914 may include separate groupings of node C.R.s 916 housed within one or more racks (not shown), or many racks housed in data centers at various geographical locations (also not shown). Separate groupings of node C.R.s 916 within grouped computing resources 914 may include grouped compute, network, memory or storage resources that may be configured or allocated to support one or more workloads. In at least one embodiment, several node C.R.s 916 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 912 may configure or otherwise control one or more node C.R.s 916(1)-916(N) and/or grouped computing resources 914. In at least one embodiment, resource orchestrator 912 may include a software design infrastructure (SDI) management entity for the data center 900. The resource orchestrator 912 may include hardware, software, or some combination thereof.

In at least one embodiment, as shown in FIG. 9, framework layer 920 may include a job scheduler 933, a configuration manager 934, a resource manager 936, and/or a distributed file system 938. The framework layer 920 may include a framework to support software 932 of software layer 930 and/or one or more application(s) 942 of application layer 940. The software 932 or application(s) 942 may respectively include web-based service software or applications, such as those provided by Amazon Web Services, Google Cloud and Microsoft Azure. The framework layer 920 may be, but is not limited to, a type of free and open-source software web application framework such as Apache Spark™ (hereinafter "Spark") that may utilize distributed file system 938 for large-scale data processing (e.g., "big data"). In at least one embodiment, job scheduler 933 may include a Spark driver to facilitate scheduling of workloads supported by various layers of data center 900. The configuration manager 934 may be capable of configuring different layers such as software layer 930 and framework layer 920 including Spark and distributed file system 938 for supporting large-scale data processing. The resource manager 936 may be capable of managing clustered or grouped computing resources mapped to or allocated for support of distributed file system 938 and job scheduler 933. In at least one embodiment, clustered or grouped computing resources may include grouped computing resource 914 at data center infrastructure layer 910. The resource manager 936 may coordinate with resource orchestrator 912 to manage these mapped or allocated computing resources.

In at least one embodiment, software 932 included in software layer 930 may include software used by at least portions of node C.R.s 916(1)-916(N), grouped computing resources 914, and/or distributed file system 938 of framework layer 920. One or more types of software may include, but are not limited to, Internet web page search software, e-mail virus scan software, database software, and streaming video content software.

In at least one embodiment, application(s) 942 included in application layer 940 may include one or more types of applications used by at least portions of node C.R.s 916(1)-916(N), grouped computing resources 914, and/or distributed file system 938 of framework layer 920. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 934, resource manager 936, and resource orchestrator 912 may implement any number and type of self-modifying actions based on any amount and type of data acquired in any technically feasible fashion. Self-modifying actions may relieve a data center operator of data center 900 from making possibly bad configuration decisions and possibly avoiding underutilized and/or poor performing portions of a data center.

The data center 900 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 900. In at least one embodiment, trained or deployed machine learning models corresponding to one or more neural networks may be used to infer or predict information using resources described above with respect to the data center 900 by using weight parameters calculated through one or more training techniques, such as but not limited to those described herein.

In at least one embodiment, the data center 900 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 800 of FIG. 8—e.g., each device may include similar components, features, and/or functionality of the computing device(s) 800. In addition, where backend devices (e.g., servers, NAS, etc.) are implemented, the backend devices may be included as part of a data center 900, an example of which is described in more detail herein with respect to FIG. 9.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 800 described herein with respect to FIG. 8. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
selecting a target resolution for a stream of images corresponding to frames of a video stream based at least on one or more conditions associated with the video stream, the target resolution being a different resolution than each of a current resolution being used to encode the stream of images to the video stream and a resolution of the frames;
based at least on the selecting, transitioning the stream of images from the current resolution to the target resolution over iterative steps, wherein each step of two or more of the iterative steps includes:
updating a step size for an adjustment of the stream of images to an intermediate resolution,
performing the adjustment of the stream of images to the intermediate resolution,
padding at least one image from the stream of images with one or more pixels, and
encoding the at least one image that is padded with the one or more pixels to one or more of the frames of the video stream; and
transmitting the one or more of the frames over a network using one or more packets.

2. The method of claim 1, wherein the transmitting includes storing, using the one or more packets, data representing one or more parameters indicating one or more of a resolution of the at least one image within a frame or a location of the at least one image within a frame.

3. The method of claim 1, further comprising:
causing a decoding of the one or more packets to one or more decoded frames, the decoding including scaling, from the target resolution to the resolution of the frames, one or more images corresponding to the one or more decoded frames; and
causing a display of the one or more decoded frames.

4. The method of claim 3, wherein the adjustment uses a different step size for a vertical resolution dimension than for a horizontal resolution dimension.

5. The method of claim 1, wherein the padding the at least one image comprises padding the at least one image with a padding region that includes the one or more pixels, wherein the one or more pixels have color values that are configured to reduce or eliminate one or more visual artifacts caused by decoding the at least one image at a boundary with the padding region.

6. The method of claim 1, wherein the adjustment aligns the intermediate resolution to a multiple of a block size of an encoding algorithm used in the encoding of the at least one image.

7. The method of claim 1, wherein the one or more conditions correspond to a target bitrate associated with the video stream.

8. The method of claim 1, wherein in response to a decrease in a complexity value of video content in the stream of images, the selecting of the target resolution is to increase the current resolution.

9. A system comprising:
one or more processing units to perform operations comprising:
determining a target resolution for a stream of images corresponding to frames of a video stream based at least on one or more conditions associated with the video stream;
based at least on the determining the target resolution, transitioning the stream of images from a current resolution to the target resolution over each step of two or more of the iterative steps includes:
updating a step size for an adjustment of the stream of images to an intermediate resolution,
performing the adjustment of the stream of images to the intermediate resolution,
padding at least one image from the stream of images with one or more pixels, and
encoding the at least one image that is padded with the one or more pixels to one or more of the frames of the video stream; and
transmitting, using one or more packets, the one or more of the frames to a device.

10. The system of claim 9, wherein encoding the one or more of the frames includes encoding data representing one or more parameters indicating one or more of a size of the one or more pixels or a location of the one or more pixels within the one or more of the frames.

11. The system of claim 9, wherein the operations further comprise padding an image of the at least one image with the one or more pixels, wherein the one or more pixels have color values that are selected to match edge pixels of the image.

12. The system of claim 9, wherein the operations further comprise causing the device to crop a frame of the one or more of the frames, upscale the cropped frame, and display the upscaled frame.

13. The system of claim 9, wherein the one or more conditions correspond to a target bitrate associated with the video stream.

14. The system of claim 9, wherein the adjustment comprises scaling the one or more of the frames by an amount that is aligned to a multiple of a pixel size defining a video compression processing boundary used in the encoding.

15. The system of claim 9, wherein the one or more conditions correspond to a complexity value indicating a level and magnitude of complexity in encoding the video stream.

16. The system of claim 9, wherein the operations further comprise, upon completion of the transitioning, maintaining the target resolution for a plurality of the frames until a new target resolution is selected for the stream of images.

17. The system of claim 9, wherein the system is comprised in at least one of:
a control system for an autonomous or semi-autonomous machine;
a perception system for an autonomous or semi-autonomous machine;
a system for performing simulation operations;
a system for performing light transport simulation;
a system for performing collaborative content creation for 3D assets;
a system for performing deep learning operations;
a system implemented using an edge device;
a system implemented using a robot;
a system for performing conversational AI operations;
a system for generating synthetic data;
a system incorporating one or more virtual machines (VMs);
a system implemented at least partially in a data center; or a system implemented at least partially using cloud computing resources.

18. At least one processor comprising:
one or more circuits to:
select a target resolution for a stream of images corresponding to frames of a video stream based at least on one or more conditions associated with the video stream, and
based at least on the selecting, to transition the stream of images from a current resolution to the target resolution over iterative steps, wherein each step of two or more of the iterative steps includes:
updating a step size for an adjustment of the stream of images to an intermediate resolution,
performing the adjustment of the stream of images to the intermediate resolution,
padding at least one image from the stream of images with one or more pixels, and
encoding the at least one image that is padded with the one or more pixels to one or more of the frames of the video stream.

19. The at least one processor of claim 18, wherein the one or more circuits are to store, in one or more packets representing the one or more of the frames, data representing one or more parameters indicating one or more of a size of the at least one image within one or more of the frames or a location of the at least one image within the one or more of the frames.

20. The at least one processor of claim 18, wherein the at least one processor is comprised in at least one of:
a control system for an autonomous or semi-autonomous machine;
a perception system for an autonomous or semi-autonomous machine;
a system for performing simulation operations;
a system for performing light transport simulation;
a system for performing collaborative content creation for 3D assets;
a system for performing deep learning operations;
a system implemented using an edge device;
a system implemented using a robot;
a system for performing conversational AI operations;
a system for generating synthetic data;
a system incorporating one or more virtual machines (VMs);
a system implemented at least partially in a data center; or
a system implemented at least partially using cloud computing resources.

* * * * *